US006378769B1

(12) United States Patent
Wolgamot

(10) Patent No.: US 6,378,769 B1
(45) Date of Patent: Apr. 30, 2002

(54) PASS THROUGH DELIVERY DEVICE

(75) Inventor: Steven Wolgamot, Mahtomedi, MN (US)

(73) Assignee: Assa Abloy Door Group, LLC, New Haven, CT (US)

( * ) Notice: Subject to any disclaimer, the term of this patent is extended or adjusted under 35 U.S.C. 154(b) by 0 days.

(21) Appl. No.: 09/370,635

(22) Filed: Aug. 6, 1999

(51) Int. Cl.$^{7}$ ................................................ B65G 11/04

(52) U.S. Cl. .......................... 232/44; 232/19; 232/43.4; 109/68

(58) Field of Search ............................... 232/43.1, 43.4, 232/43.5, 44, 19, 22; 220/345.1, 345.2, 476; 109/68, 67; 49/68

(56) References Cited

U.S. PATENT DOCUMENTS

| | | | | |
|---|---|---|---|---|
| 845,964 | A | * | 3/1907 | Mittendorf |
| 914,528 | A | * | 3/1909 | Thinnes |
| 952,173 | A | * | 3/1910 | Zitko |
| 1,346,174 | A | | 7/1920 | Canner |
| 2,034,916 | A | | 3/1936 | Majors |
| 2,163,356 | A | | 6/1939 | Solberg |
| 2,730,053 | A | * | 1/1956 | Ellithorpe |
| 3,109,585 | A | | 11/1963 | Freeman |
| 3,145,918 | A | * | 8/1964 | Higgins et al. |
| 4,135,658 | A | * | 1/1979 | Hagberg |
| 4,190,004 | A | * | 2/1980 | Richardson |
| 4,195,744 | A | | 4/1980 | Christianson |
| 4,245,776 | A | * | 1/1981 | Miner |
| 4,640,200 | A | * | 2/1987 | Richardson |
| 5,027,948 | A | | 7/1991 | Forbes et al. |
| 5,205,224 | A | | 4/1993 | Durst |
| 5,615,624 | A | | 4/1997 | Terry et al. |
| 5,624,071 | A | | 4/1997 | Sosan |
| 5,802,991 | A | * | 9/1998 | Brown et al. |
| 5,845,843 | A | | 12/1998 | Kuller |
| 5,921,191 | A | * | 7/1999 | Gabel |

* cited by examiner

*Primary Examiner*—Lynne H. Browne
*Assistant Examiner*—William L. Miller

(57) ABSTRACT

A pass through closure and delivery device permitting material to be safely passed through a slot in a partition or prison cell door. A container having first and second openings and first and second doors associated with each opening is disclosed for mounting on a partition or cell door having a slot therethrough. Each door on the container includes a latch that is operable from only one side of the cell door. A cam-operating attaching mechanism allows the container to be releasably mounted to a pair of track members affixed to the cell door with the slot therebetween. Using the pass through delivery device and the method of the present device, food or other materials can be safely delivered to an inmate inside a locked cell by mounting the container of the pass through delivery device on the cell door with one of the openings adjacent the first door covering the slot in the partition. The second door is then opened, allowing a guard or delivery person to insert a food tray or other materials to be delivered into the container. The second door is then latched shut and the first door is then opened to allow the prisoner access to the food or other materials through the cell door slot and the first opening in the container. After the inmate removes the food or material from the container, the first door is again shut and the container can be removed from the cell door.

16 Claims, 7 Drawing Sheets

PASS THROUGH DELIVERY DEVICE

BACKGROUND OF THE INVENTION

1. Technical Field

This invention relates generally to the field of pass-through delivery systems, whereby items are passed from one person to another through a structural partition such as a wall or door. More particularly, the present invention relates to an apparatus and method for safely delivering food or other materials to a person confined within a secure room, as might be done when delivering food or mail to a prison inmate through a locked cell door.

2. Background Information

It is a common practice in many prisons and other detention facilities to deliver food or other materials to an inmate while the inmate is confined within a locked room or cell. Typically, the door used on a prison cell is constructed with a small opening or slot through the door, which is usually covered by a hinged panel that can be opened and closed from outside of the cell. A small shelf often extends from the outside of the door near the opening. A prison guard or other employee can pass a food tray or other materials to an inmate inside the locked prison cell by opening the hinged panel from outside the cell and setting the food tray or materials on the shelf. The prisoner inside of the cell can then receive the food or materials through the pass through slot in the door.

Unfortunately, conventional pass through openings of the type described above pose a significant risk to prison guards and other personnel outside the cell when the hinged panel is opened. During such time, an inmate inside the cell may attempt to reach through the pass through opening and grab or strike the guard or delivery person delivering food. An inmate may also attempt to throw objects through the pass through opening or to push the food tray back on to the guard or food delivery person.

In a particularly egregious practice, known among prison personnel as a "gas attack" or "gassing," some inmates with psychological or behavioral problems attempt to throw, splash, spit, or otherwise project bodily fluids or airborne pathogens at prison staff personnel through the open slot in the cell door during food delivery. With the prevalence of HIV infection among inmates in many prison populations, the ability to protect prison staff personnel from so-called "gas attacks" is increasingly important.

It would therefore be desirable to have in the art a pass through system that is capable of transferring food and other items through a locked cell door or other partition while at the same time effectively protecting prison employees against gas attacks and harmful contact with the recipient inside the cell. Such a pass through system should of course be ruggedly constructed to withstand use in the prison environment and should also be easy and quick to use, so as not to unduly impede the efficient delivery of food or materials to many inmates in large correctional facilities. It would also be advantageous if such a pass through system was capable of being used with existing prison doors and partitions as well as being capable of incorporation in new prison facilities.

BRIEF SUMMARY OF THE INVENTION

The present invention overcomes the drawbacks associated with conventional prison food delivery apparatus by providing a pass through delivery device that permits material to be safely passed through a slot in a partition or cell door. The delivery device has a container with two openings that are closable by first and second doors and the container is adapted for mounting on one side of the partition with one of the openings communicating with the slot in the partition. The first door is mounted for movement between a first position in which the first door is between the partition slot and the container opening that is adjacent the slot and a second position permitting open communication between the partition slot and the container opening. The second door is mounted at the second opening in the container for movement between an open position permitting access to the interior of the container and a closed position closing the second opening.

A latch for selectively maintaining the first door at the first position and a second latch for selectively maintaining the second door at the closed position are positioned to permit access thereto from only one side of the partition. Advantageously, the first and second doors can be operated alternatively by a prison guard or other delivery person located on one side of the partition to pass material through the partition slot without being exposed to the danger of gas attacks or other harmful contact from a person on the other side of the partition because one of the two doors is always closed during the delivery process, thereby preventing the inmate from contacting or throwing objects or fluids at prison employees.

The pass through delivery device may include a pair of track members affixed to the partition with the slot therebetween and the first door may be slidably disposed between the pair of track members. An attaching mechanism may also be affixed to the container for releasably mounting the container to the partition and, advantageously, the attaching mechanism may be a clamping mechanism releasably clamping the container to the pair of track members.

The present invention also provides a kit for mounting a removable pass through delivery device on a partition having a slot therein to permit material to be safely passed through the slot in the partition. The kit includes a pair of track members adapted to be mounted on one side of the partition and a container having first and second openings and adapted to be mounted on the track members with the first opening communicating with the slot in the partition. A first door adapted to be mounted on the track members is provided in the kit for movement between a first position between the slot and the first container opening and a second position permitting open communication between the slot and the first container opening. A latch is provided for mounting adjacent the first door for selectively maintaining the first door at its first position. A second door for mounting at the second container opening is provided for movement between an open position permitting access to the interior of the container and a closed position closing the second opening of the container. A latch is provided to be mounted adjacent the second door for selectively maintaining the second door at its closed position. When the removable pass through delivery device is mounted on the partition, the latches are positioned to permit access thereto from only one side of the partition. The kit may also include a clamping mechanism adapted to be affixed to the container for releasably clamping the container to the pair of track members mounted on one side of the partition.

Material can be safely passed through a slot in a partition or cell door from one side thereof using the method of the present invention. A container with first and second openings and first and second doors for selectively opening and closing the openings is positioned adjacent the partition with its first opening located adjacent the slot in the partition. A guard or delivery person on one side of the partition opens the second door while maintaining the first door in its closed position and places material in the container through the second opening from one side of the partition. After closing the second door, the guard then opens the first door to permit the material to be removed from the container through the first opening by an inmate or person on the other side of the partition. After delivery, the first door can then be closed and the container removed from its position adjacent the partition and stored or used to deliver material to other cells.

Using the pass through delivery device of the present invention, therefore, it is possible to pass food or other material from one side of a cell door to an inmate inside the cell without both of the doors on the device being opened at the same time, thus ensuring the safety of the guard or delivery person. Moreover, the delivery device of the present invention is quick and easy to use and is reusable such that a single delivery device may be used to deliver food to inmates in many different cells. These and other advantages of the present invention will become apparent upon reading the following detailed description and appended claims, and upon reference to the accompanying drawings.

BRIEF DESCRIPTION OF THE DRAWINGS

For a more complete understanding of this invention reference should now be had to the embodiments illustrated in greater detail in the accompanying drawings and described below. In the drawings, which are not necessarily to scale.

DETAILED DESCRIPTION OF THE INVENTION

The present invention will now be described fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. It will be understood that all alternatives, modifications, and equivalents are intended be included within the spirit and scope of the invention as defined by the appended claims.

Figure 1A:
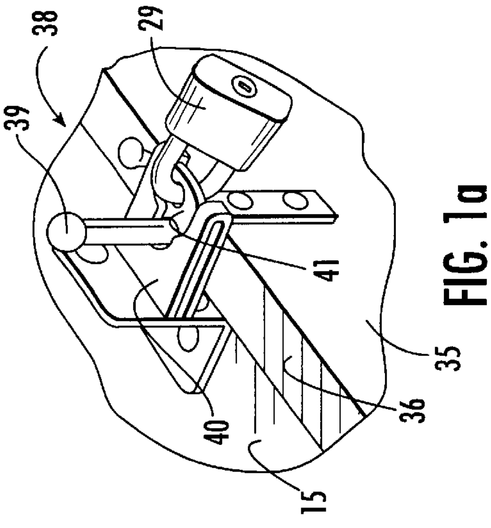
FIG. 1*a* is a perspective view of a latch for use on the second door of the pass through delivery device.
Figure 1:
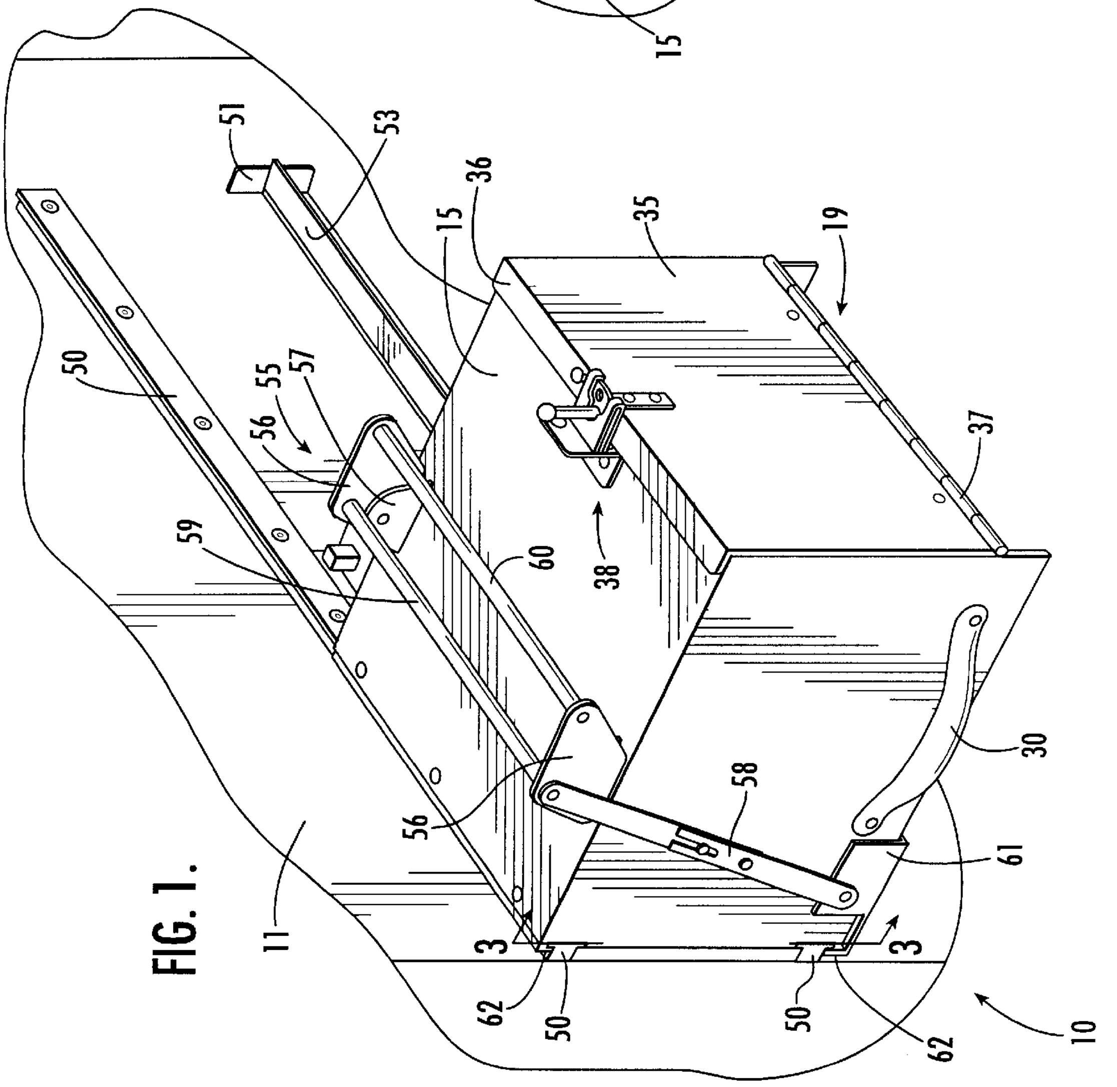
FIG. 1 is a perspective view of a pass through delivery device according to one embodiment of the present invention affixed to a cell door.
Figure 2B:
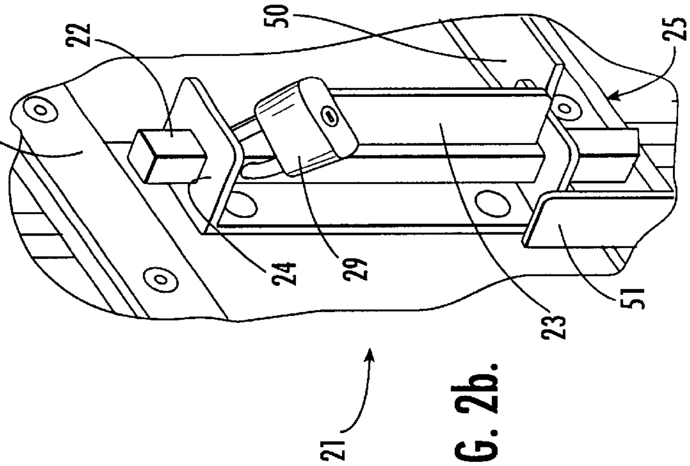
FIG. 2*b* is a perspective view of a latch for use on the first door of the pass through delivery device.
Figure 2:
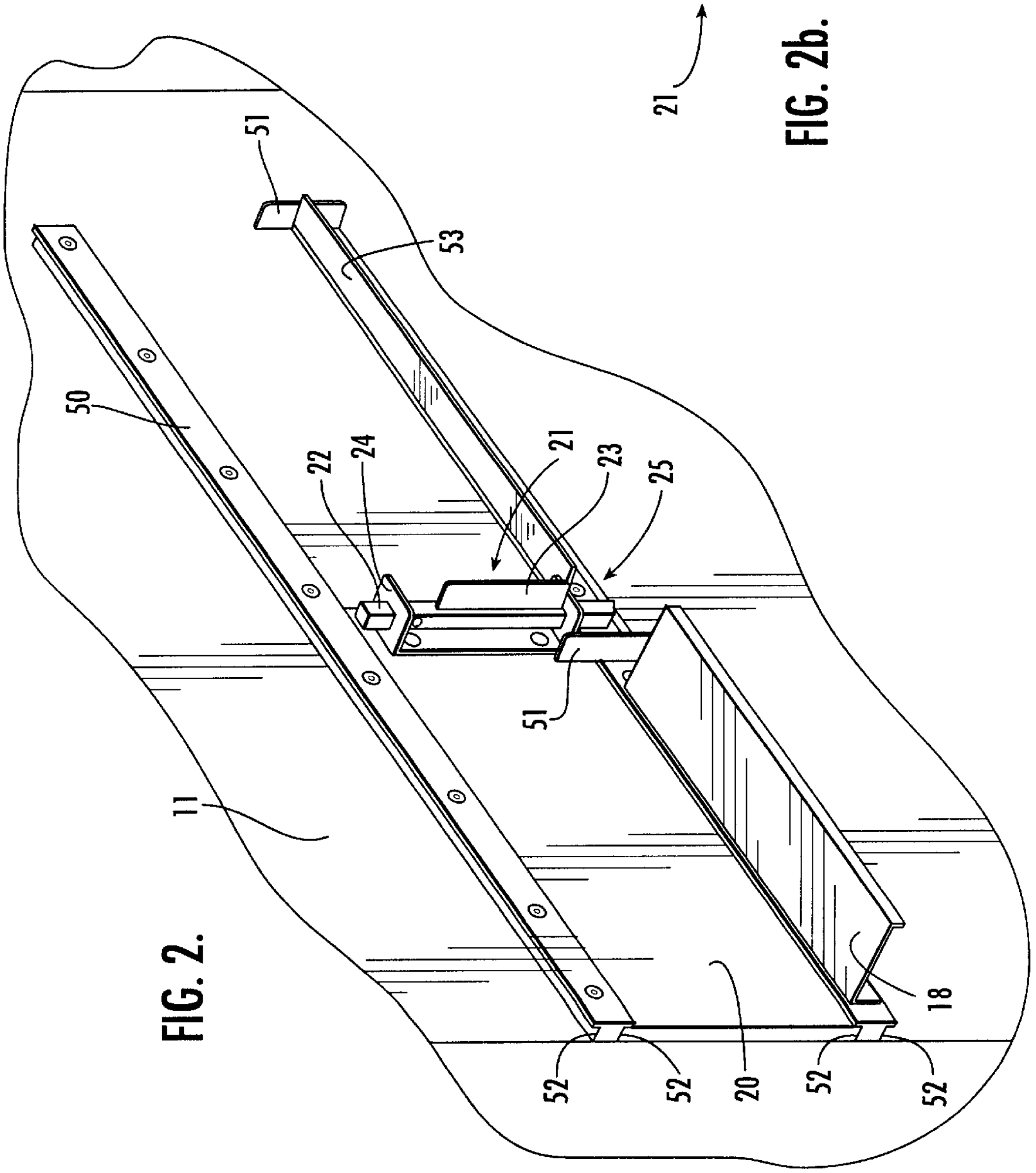
FIG. 2 is a perspective view of the first door and surrounding structure according to one embodiment of the present invention.

Turning now to FIGS. 1 and 2, there is shown a pass through delivery device 10 for permitting material to be safely passed through a slot in a partition or cell door 11. The pass through device comprises a container 15, first and second doors, 20, 35, and first and second latches 21, 38. The container 15 has a first opening 14 (see FIG. 4*a*) and a second opening 16 (see FIGS. 4*d*, 4*f*) and may be fabricated from any suitable material that is rugged and yet lightweight. A particularly suitable material is ⅛ inch thick aluminum sheet metal. The container may be equipped with handles 30 to assist in mounting the container 15 to the partition or cell door 11. The pass through delivery device may also include an attaching mechanism 55 for releasably attaching the container 15 to the cell door 11 and a particularly advantageous attaching mechanism is discussed in more detail below.

As shown in FIG. 1, the second door 35 is mounted at the second opening of the container 15 and, advantageously, a continuous stainless steel hinge 37 may be used to mount the second door 35 to the container 15. The second door is movable between a closed position (as illustrated in FIG. 1) in which the second door 35 closes the second end of the container and an open position (illustrated in FIG. 4*e*) in which access is permitted to the interior 17 of the container. While the container 15 may be fabricated in any suitable size and cross-sectional shape, in a preferred embodiment the container 15 has a rectangular cross-sectional shape and is sized to accommodate a standard inmate feeding tray in the interior 17 of the container. A flange 36 may also be provided on the second door 35.

A second latch 38 is used to selectively maintain the second door 35 in the closed position and a suitable catch for use as a second latch 38 is illustrated in FIG. 1*a*. The second latch 38 includes a catch mechanism 40 affixed to the container 15 and an associated latching post 39 affixed to the second door 35. A release 41 on the catch mechanism 40 securely holds the latching post 39 in place when the second door 35 is in the closed position. When it is desired to move the second door 35 to its open position, a guard or other delivery person may move the release 41 laterally in the catch mechanism 40, grasp the latching post 39 and move the second door 35 to its open position. A hole may be provided in the release 41 for the provision of a padlock 29 if it is desired to lock the second door 35 in the closed position. It should be understood, however, that the second latch 38 is capable of maintaining the second door 35 in the closed position without using a padlock 29.

The container 15 is adapted for mounting on one side of the partition 11 and, when properly mounted thereon, the first opening 14 in the container 15 is adjacent a slot 12 in the partition and the communication is established between the slot 12 and the first opening 14. A first door 20 is mounted to be movable between a first position in which the first door 20 is between the slot 12 in the partition and the first opening 14 in the container 15 and a second position permitting communication between the partition slot 12 and the first opening 14.

FIG. 2 illustrates an advantageous mounting of the first door 20 onto a partition or cell door 11. A pair of track members 50 are affixed by a suitable method, such as welding, to the partition 11 with the slot 12 therebetween and the first door 20 is slidably disposed between the pair of track members in channels 52 formed between the track members and the partition. In this arrangement, the first door 20 is movable between a first position adjacent and covering the slot 12 and a second position exposing the slot 12 and allowing communication between the slot 12 and the first opening 14 in the container. One of the track members 50 includes a guide track 53, a notch 25 and a pair of stops 51 to prevent over extension of the first door past the first or second positions. The track members and the slot may be fabricated from any suitable material; however, 7 gauge steel is a particularly suitable material to use in fabricating the T-shaped guides and the first door. An optional shelf 18 may be provided on a track member or, alternatively, on the partition 11. When present, the shelf 18 is generally positioned below the slot 12 in the partition 11 and the position of the shelf may be adjustable.

A first latch 21 allows for selectively maintaining the first door 20 at its first position and a suitable latch for use as a first latch mechanism is illustrated in FIG. 2*b*. The first latch mechanism 21 includes a lock guide 24, a square bar 22, and a bar handle 23. The first latch 21 is positioned on the first door 20 such that the square bar 22 is positioned within the notch 25 when the first door 20 is in its first position. In this position, the square bar 22 is disposed between the guide track 53 and one of the stops 51 to prevent the first door 20 from moving out of its first position.

When it is desired to move the first door 20 to its second position, a guard may use the bar handle 23 to move the square bar within the lock guide 24 to a position in which the bar is clear of the guide track 53, thereby free to slide within the channels 52 of the pair of track members. As illustrated in FIG. 2*b,* a hole may be provided in the square bar 23 for the provision of a padlock 29 if it is ever desired to lock the first door 20 in its first position. It should be noted, however, that the first latch 21 is capable of maintaining the first door 20 in its first position, as described above, without using the padlock 29. Also, the first latch 21 may be advantageously positioned in a vertical orientation such that gravity will ensure that the square bar 22 falls into the notch 25 when the first door 20 is moved to its first position. The square bar may be made from any suitable material, but a particularly suitable material is ½ inch square steel.

While the container 15 of the present invention may be permanently or semi-permanently mounted on the partition or cell door 11, it is advantageous to equip the container 15 with a suitable attaching mechanism to thereby allow the container to be releasably mounted on the cell door. In this way, a single container 15 can be used to deliver food to many different inmates in many different cells. Those skilled in the art will recognize that a variety of different releasable attaching mechanisms may be used to releasably attach the container 15 to the partition 11—such as, for example, sliding the container onto tracks affixed to the partition; equipping the partition with extending posts that cooperate with mounting apertures on the container, or using quick release bolts or fittings to mount the container onto the partition—but a particularly advantageous attaching mechanism is a clamping mechanism illustrated in FIG. 3.

Figure 3:
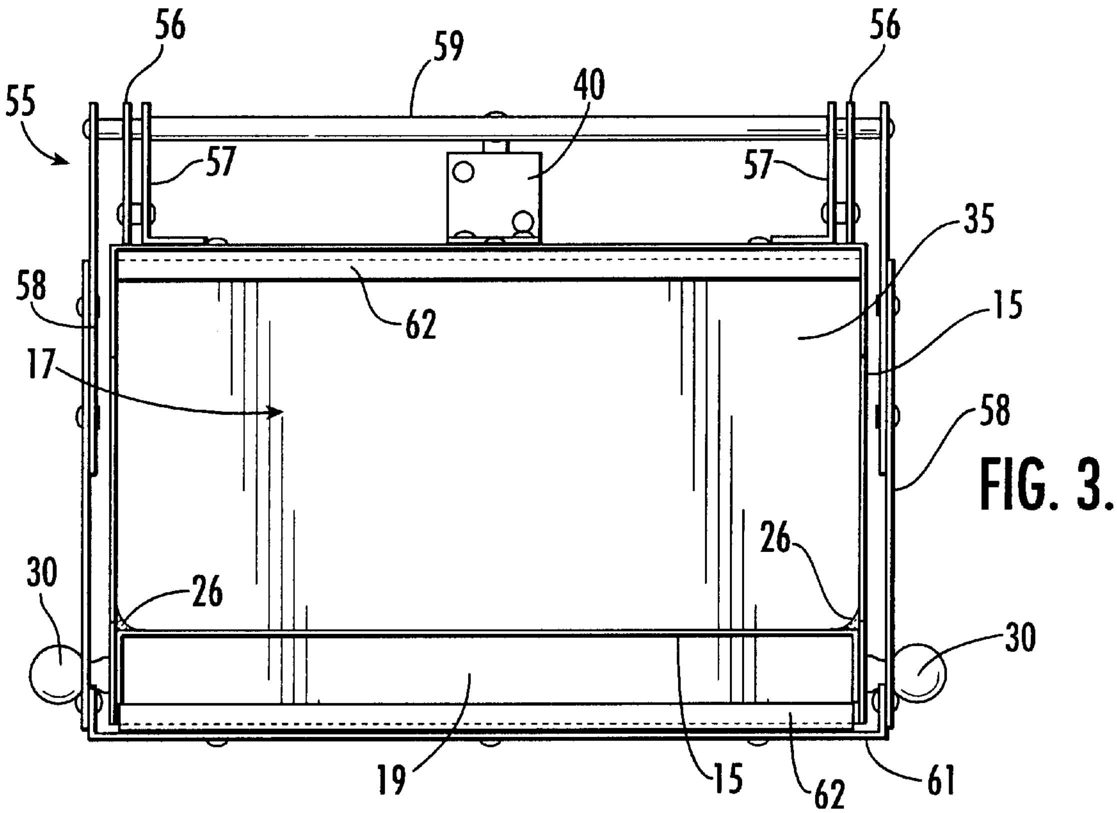
FIG. 3 is an elevation view of a container and clamping device according to one embodiment of the present invention, taken along the 3—3 line in FIG. 1.

FIG. 3 is a plan view of the container 15, taken along the viewing line 3—3 in FIG. 1. In this view, the interior 17 of the container 15 is visible as well as an open cavity 19 defined by the container 15. Because the pass through device of the present invention may be installed on existing prison cell doors, many of which have a shelf 18 extending outwardly therefrom, provision is made in the container for an open cavity 19 to receive the preexisting shelf without interfering with the operation of the pass through delivery device. When the device is mounted on such an existing cell door, the shelf 18 is received in the open cavity 19. Also visible in FIG. 3 is a weld seam 26 which may be provided in fabricating the container 15 at the junction of container sides to increase the structural integrity of the container and assist in maintaining sanitation of the container by filling in cracks or gaps at the junction in which food or harmful bacteria or viruses may be located.

With regard to the sanitation, it should be noted that closable ports (not shown) extending through the container walls may be provided to provide an opening through which an antibacterial agent or other disinfecting agent can be introduced if desired to disinfect the interior of the container. For example, disinfecting spray may be introduced into the interior of the cavity after delivering food to an inmate, and while the first and second doors are in the first and closed positions, respectively, to disinfect the container before using the container to deliver food to another inmate.

The attaching mechanism 55 is preferably a clamping mechanism including two opposed latch hooks 62 that engage channels 52 of the track members 50 (as shown in FIGS. 4*b*–4*h*). One of the latch hooks 62 is adjustably connected to a latch tray 61, which is pivotably mounted to the container 15 and made to pivot by operation of a cam 56 through adjustable linkages 58. The cam 56 is secured to the container 15 by a cam mount 57 and is made to operate by an operating handle 60. A support bar 59 may extend between the cams if desired.

Figure 4A:
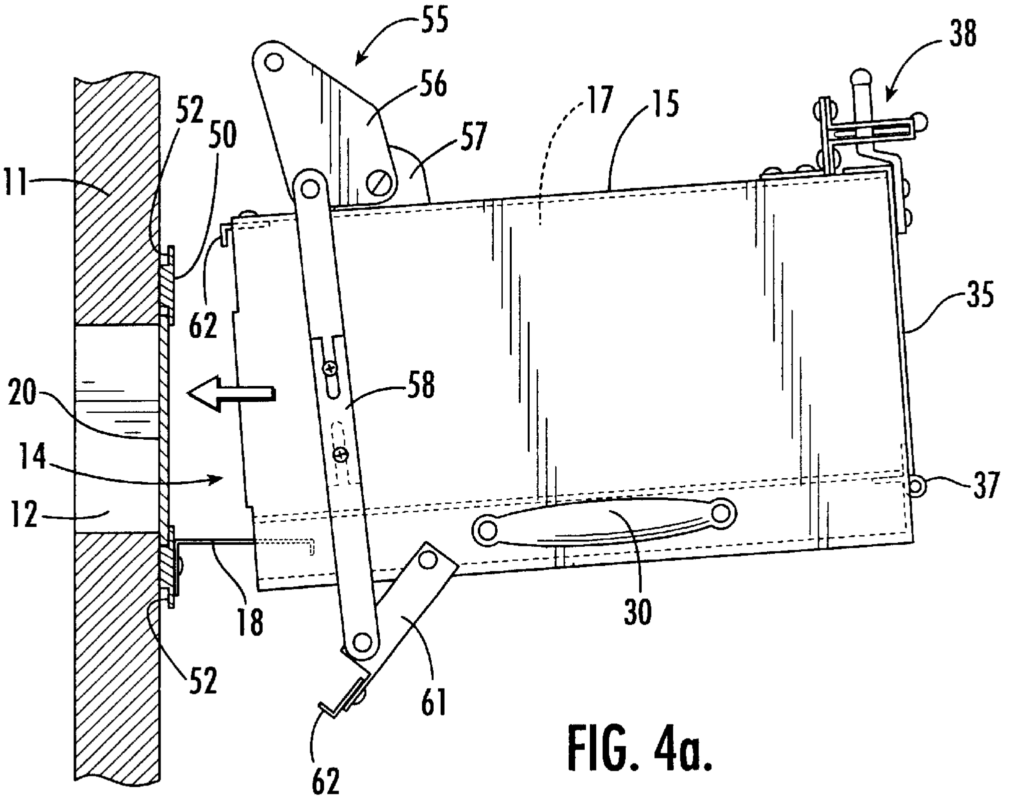
FIG. 4*a*–4*h* are side elevation views of a pass through delivery device according to one embodiment of the present invention, with the cell door and track members shown partially in section, illustrating a method of delivering a food tray through a cell door.
Figure 4B:
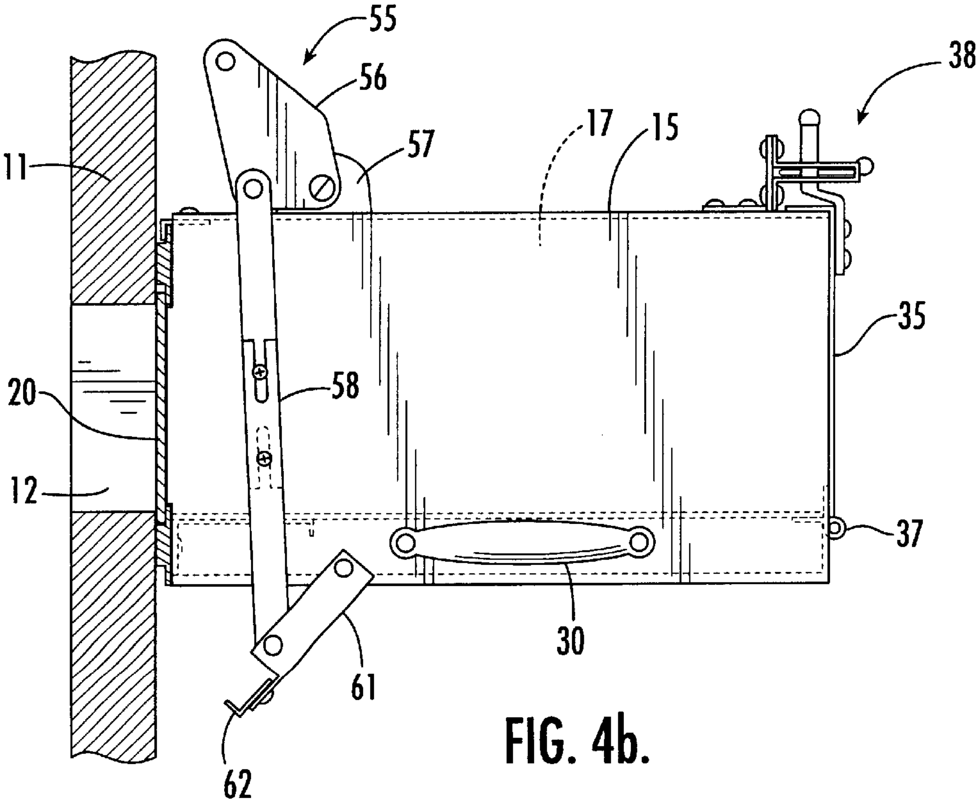

Operation of the clamping mechanism is shown in FIGS. 4*a*–4*h,* which also illustrate a method of safely passing material through a slot 12 in a partition or cell door 11. To deliver food or other materials to a prison inmate using the pass through delivery device of the present invention, the container 15 is first positioned adjacent the partition 11 with the first opening 14 of the container adjacent the slot 12 in the partition. The first door 20 is in its first position and therefore communication is prevented between the slot 12 and the first opening 14 of the container 15, as shown in FIG. 4*a*. As illustrated in FIG. 4*b,* the container 15 is initially "hung" on one of the track members 50 by inserting one of the latch hooks 62 in the channel 52 of one of the track member 50.

Figure 4C:
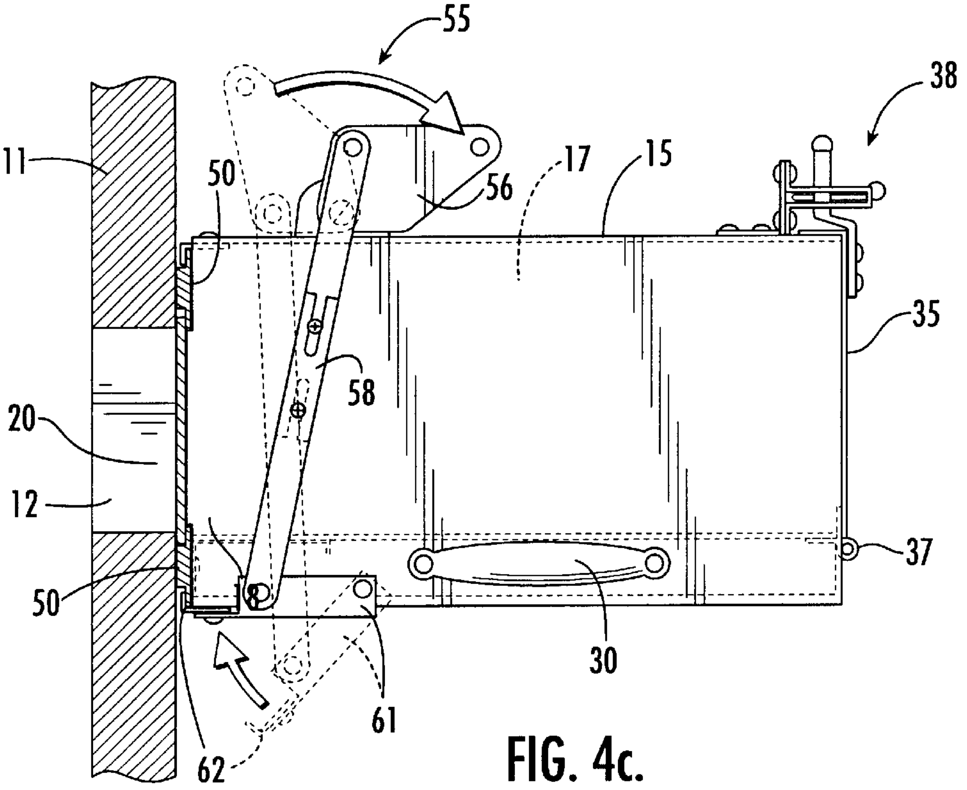

As illustrated in FIG. 4*c,* after "hanging" the container 15 on one of the track members 50, a guard or delivery person using the operating handle 60 can then move the cam 56 away from the partition or cell door 11 to thereby cause the latch hook 62 attached to the latch tray 61 to engage a channel 52 of the other track member, thereby securing the container 15 to the partition 11 by clamping action against the pair of track members. The shape of the cam 56 ensures that when the clamping mechanism is fully engaged, there is a space between the operating handle 60 and the container 15 to prevent a guard or delivery person from smashing his or her fingers between the operating handle 60 and the container 15 when moving the cam 56. Once clamped, the container is securely affixed to the partition and cannot be moved by an inmate inside the prison cell.

Figure 4D:
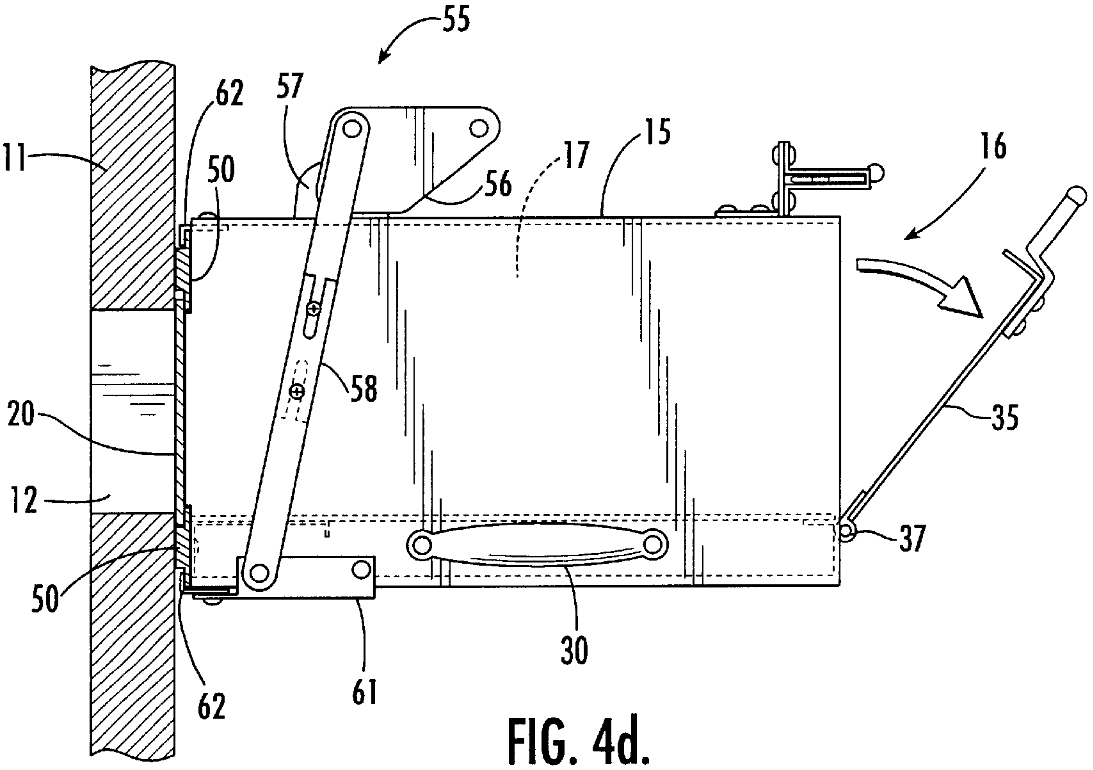
Figure 4E:
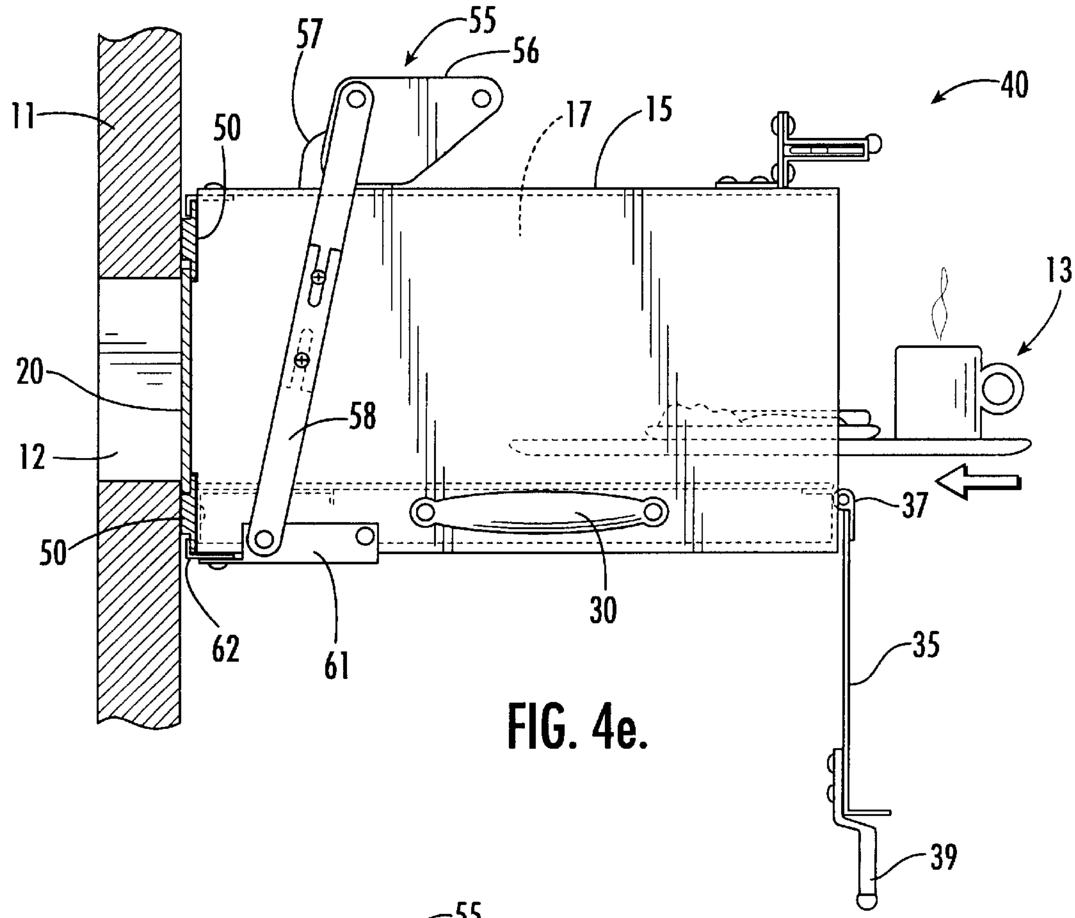
Figure 4F:
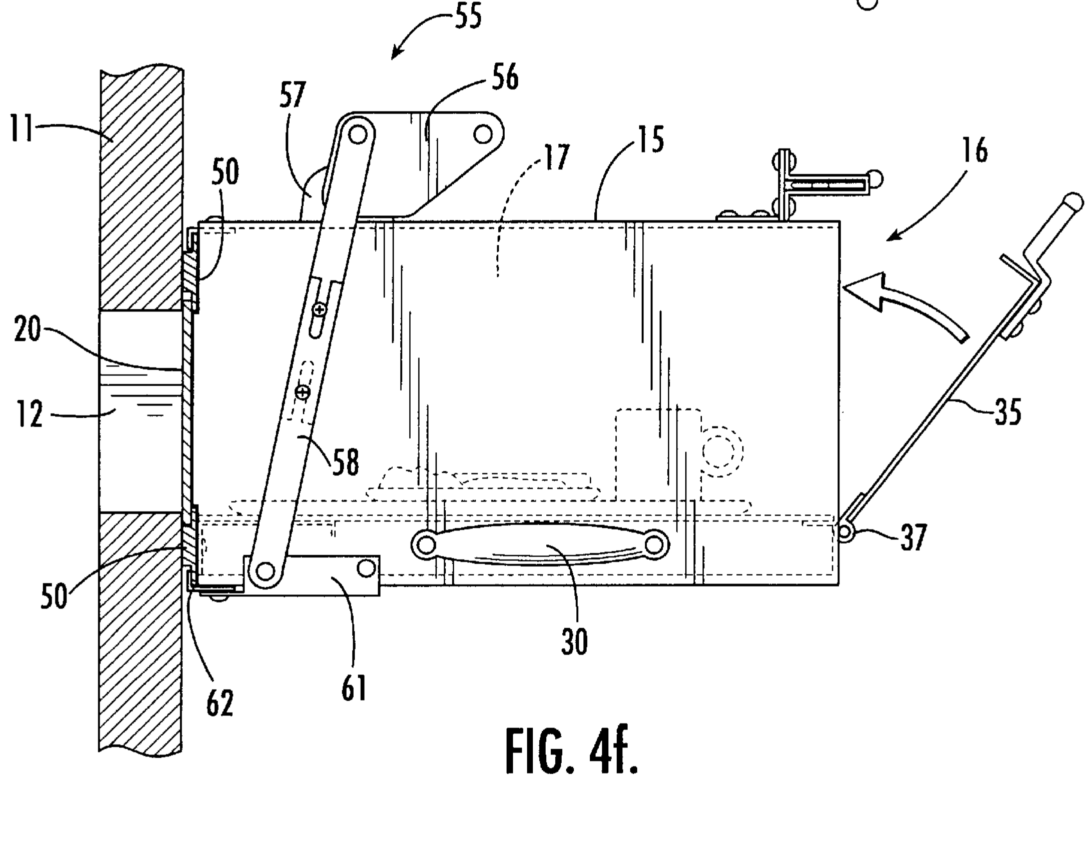

Once the container 15 is securely positioned adjacent the partition such that the first opening 14 is adjacent the slot 12 in the partition 11, a guard or delivery person wishing to pass materials to an inmate inside the cell can then open the second door 35, as illustrated in FIG. 4*d.* Once the second door 35 is moved to its open position, which is illustrated in FIG. 4*e,* items to be delivered through the partition such as a food tray 13 may be placed in the container 15 through the second opening 16 of the container 15. Once the items to be delivered 13 are within the interior 17 of the container, the guard or delivery person then moves the second door 35 to its closed position, as illustrated in FIG. 4*f.*

Figure 4G:
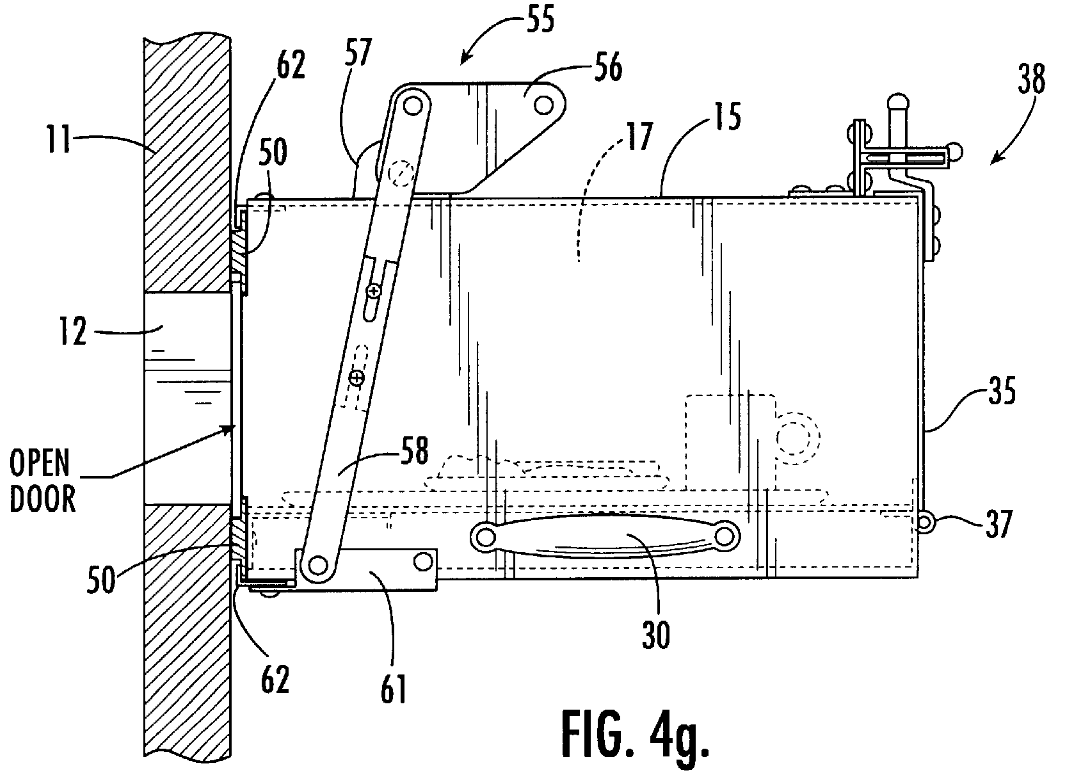
Figure 4H:
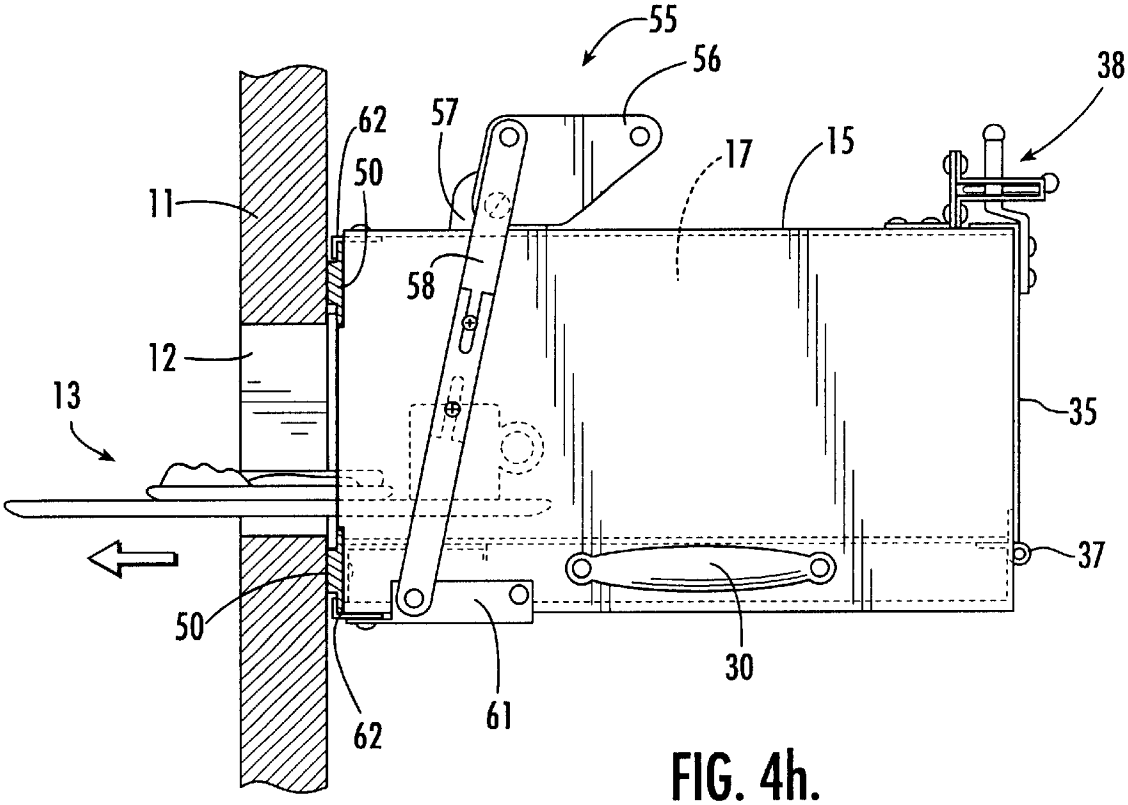

As illustrated in FIG. 4*g,* once the second door 35 is latched in its closed position, the first door 20 can be moved or slid to its second position, wherein communication is established between the slot 12 in the partition 11 and the first opening 14 in the container. As illustrated in FIG. 4*h,* an inmate inside the cell can then remove the items to be delivered 13 from the container 15 through the slot 12. After verifying that the items to be delivered have been removed from the container, which can be done using a conventional cell door viewing window, the guard can then move the first door 20 back to its first position to thereby close the slot 12 and the container 15 can be removed by reversing the mounting steps described above.

As shown by the above discussion, the present pass through delivery device uses a container and two doors to allow pass through delivery of materials while at the same time isolating an inmate inside the cell from contact with guards or delivery personnel outside the cell. This isolation is achieved using a container that can be releasably but securely affixed to the partition and using first and second latch mechanisms that are only operable from one side of the cell door—the outside. Thus, when the first door covering the slot is open, the prisoner cannot throw items or splash bodily fluids onto the guard or delivery person nor can the prisoner defeat the pass through delivery device by knocking it off of the partition. After delivering the materials, a guard can move the first door to its first position and the first door will remain latched in this position even after the pass through delivery device is removed.

It will readily be understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to its preferred embodiment, it is to be understood that this disclosure is only illustrative and exemplary of the present invention and is made merely for the purpose of providing a full and enabling disclosure of the invention. The foregoing disclosure is not intended to be construed to limit the present invention or otherwise to exclude any such other embodiments, adaptations, variations, modifications or equivalent arrangements; the present invention being limited only by the claims appended hereto and the equivalents thereof. Although specific terms are employed herein, they are used in a generic and descriptive sense only and not for the purpose of limitation.

That which is claimed is:

1. A pass through delivery device in combination with a partition and which permits material to be safely passed from a first side of the partition to a second side of the partition through a slot in the partition, said device comprising:

a container having first and second openings and being mounted on a pair of track members affixed to said first side of the partition with the slot therebetween and said first door slidably disposed between said pair of track members with the first opening communicating with the slot in the partition;

a first door mounted on said first side of the partition for movement between a first position between the partition slot and the first opening of said container and a second position permitting open communication between the partition slot and the first opening of said container;

a first latch for selectively maintaining said first door at the first position thereof, said first latch being positioned on said first side of the partition to permit access thereto from only one side of the partition;

a second door mounted at the second opening of said container for movement between an open position permitting access to the interior of said container and a closed position closing the second opening of said container; and a second latch for selectively maintaining said second door at the closed position, said second latch being positioned to permit access thereto from only one side of the partition, whereby said first and second doors can be accessed and operated only by an operator located on said first side of the partition so that the first and second doors can be operated alternatively by the operator to pass material through the partition slot without the operator being exposed to said second side of the partition.

2. A combination as defined in claim 1, further comprising an attaching mechanism for releasably mounting said container to the partition.

3. A combination as defined in claim 2, wherein said attaching mechanism comprises a clamping mechanism mounted on said container releasably clamping said container to said pair of track members.

4. A combination as defined in claim 1, wherein said second door is mounted at the second opening of said container by a hinge.

5. A combination as defined in claim 1, wherein the cross-sectional shape of said container is substantially rectangular.

6. A pass through closure for a prison cell that permits material to be safely passed to a person inside the cell, said closure comprising:

a cell door having a first side, a second side and a slot therethrough;

a container having first and second openings and being adapted for mounting on said first side of the cell door with the first opening communicating with the slot in said cell door;

a first door mounted on said first side of said cell door for movement between a first position between the slot in said cell door and the first opening of said container and a second position permitting open communication between the cell door slot and the first opening of said container;

a first latch for selectively maintaining said first door at the first position thereof, said first latch being positioned on said first side of said cell door to permit access thereto from only said first side of said cell door;

a second door mounted at the second opening of said container for movement between an open position permitting access to the interior of said container and a closed position closing the second opening of said container; and a second latch for selectively maintaining said second door at the closed position, said second latch being positioned to permit access thereto from only said first side of said cell door, whereby said first and second doors can be accessed and operated only by an operator located on said first side of said cell door so that said first and second doors can be operated alternatively by the operator to pass material through the cell door slot without the operator being exposed to said second side of said cell door.

7. A pass through closure as defined in claim 6, further comprising a pair of track members affixed to said cell door with the slot therebetween and wherein said first door is slidably disposed between said pair of track members.

8. A pass through closure as defined in claim 7, further comprising an attaching mechanism for releasably mounting said container to said cell door.

9. A pass through closure as defined in claim 8, wherein said attaching mechanism comprises a clamping mechanism mounted on said container releasably clamping said container to said pair of track members.

10. A pass through closure as defined in claim 6, wherein said second door is mounted at the second opening of said container by a hinge.

11. A pass through closure as defined in claim 6, wherein the cross sectional shape of said container is substantially rectangular.

12. A kit for mounting a removable pass through delivery device on a partition having a slot therethrough that permits material to be safely passed though the slot in the partition, said kit comprising:

a pair of track members adapted to be mounted on one side of the partition;

a container having first and second openings and adapted to be mounted on said track members with the first opening communicating with the slot in the partition;

a first door adapted to be mounted on said track members for movement between a first position between the partition slot and the first opening of said container and a second position permitting open communication between the partition slot and the first opening of said container;

a first latch adapted to be mounted adjacent said first door for selectively maintaining said first door at the first position thereof, said first latch being positioned to permit access thereto from only one side of the partition when the removable pass through delivery device is mounted on the partition;

a second door adapted to be mounted at the second opening of said container for movement between an open position permitting access to the interior of said container and a closed position closing the second opening of said container; and a second latch adapted to be mounted adjacent said second door for selectively maintaining said second door at the closed position, said second latch being positioned to permit access thereto from only one side of said partition when the removable pass through delivery device is mounted on the partition, whereby when the removable pass through delivery device is mounted on the partition said first and second doors can be operated alternatively by an operator located on one side of the partition to pass material through the partition slot without being exposed to the other side of the partition.

13. A kit for mounting a removable pass through delivery device on a partition as defined in claim 12, further comprising a clamping mechanism adapted to be affixed to said container for releasably clamping said container to said pair of track members when said pair of track members is mounted on one side of the partition.

14. A method of safely passing material from a first side of a partition to a second side of the partition through a slot in the partition from said first side thereof, comprising the steps of:

providing a container having first and second openings and first and second doors for selectively opening and closing the openings, respectively;

positioning the container adjacent to and on said first side of the partition with the first opening located adjacent the slot in the partition;

opening the second door while maintaining the first door in its closed position and placing material in the container through the second opening from said first side of the partition; and closing the second door and then opening the first door from a position on said first side of the partition to permit the material to be removed from the container through the first opening from said second side of the partition, whereby an operator located on said first side of the partition can pass the material from said first side of the partition to said second side thereof without both of the doors being opened at the same time and without the operator being exposed to said second side of the partition while passing material.

15. A method of safely passing material through a slot in a partition as defined in claim 14, comprising the additional step of moving the first door to close the first opening in the container after the material has been passed from said first side of the partition to said second side thereof.

16. A method of safely passing material through a slot in a partition as defined in claim 15, comprising the final step of removing the container from the position adjacent the partition.

* * * * *